(12) United States Patent
Blaxill et al.

(10) Patent No.: US 10,400,696 B2
(45) Date of Patent: Sep. 3, 2019

(54) METHOD FOR STARTING AN INTERNAL COMBUSTION ENGINE

(71) Applicant: MAHLE Powertrain LLC, Farmington Hills, MI (US)

(72) Inventors: Hugh Blaxill, Novi, MI (US); Michael Bunce, Plymouth, MI (US)

(73) Assignee: MAHLE POWERTRAIN, LLC, Farmington Hills, MI (US)

( * ) Notice: Subject to any disclaimer, the term of this patent is extended or adjusted under 35 U.S.C. 154(b) by 0 days.

(21) Appl. No.: 15/437,950

(22) Filed: Feb. 21, 2017

(65) Prior Publication Data

US 2018/0010536 A1   Jan. 11, 2018

(30) Foreign Application Priority Data

Jul. 6, 2016  (EP) .................................... 16001518

(51) Int. Cl.
| | |
|---|---|
| F02D 41/06 | (2006.01) |
| F02B 19/10 | (2006.01) |
| F02D 41/14 | (2006.01) |
| F02D 41/40 | (2006.01) |
| F02N 19/00 | (2010.01) |

(52) U.S. Cl.
CPC ........ *F02D 41/062* (2013.01); *F02B 19/1085* (2013.01); *F02B 19/12* (2013.01); *F02D 37/02* (2013.01); *F02D 41/064* (2013.01); *F02D 41/1454* (2013.01); *F02D 41/3094* (2013.01); *F02D 41/402* (2013.01); *F02M 57/06* (2013.01); *F02N 19/00* (2013.01); *F02N 19/06* (2013.01); *F02P 5/045* (2013.01); *F02P 5/1506* (2013.01); *F02P 13/00* (2013.01); *F02B 19/1009* (2013.01); *F02N 19/08* (2013.01); *F02N 2019/002* (2013.01); *Y02T 10/125* (2013.01); *Y02T 10/44* (2013.01); *Y02T 10/46* (2013.01)

(58) Field of Classification Search
CPC .. F02B 19/10; F02B 19/1009; F02B 19/1023; F02B 19/108; F02B 19/1085
See application file for complete search history.

(56) References Cited

U.S. PATENT DOCUMENTS

| | | | | |
|---|---|---|---|---|
| 4,182,287 A | * | 1/1980 | Yagi | F02B 19/1028 123/260 |
| 8,882,863 B2 | * | 11/2014 | Modroukas | F02B 51/02 123/272 |

(Continued)

*Primary Examiner* — Sizo B Vilakazi
*Assistant Examiner* — Kevin R Steckbauer
(74) *Attorney, Agent, or Firm* — Mark Terry

(57) ABSTRACT

A method for starting an internal combustion engine comprises the steps of: providing an internal combustion engine having at least one cylinder and a piston supported at a crankshaft for repeated reciprocal movement in the cylinder so as to define a main combustion chamber, the internal combustion engine further having an ignition device arranged in said cylinder with an igniter portion and a fuel injector which are both arranged at a pre-chamber, wherein the pre-chamber has a plurality of orifices for providing fluid communication between said pre-chamber and the main combustion chamber, injecting fuel in the pre-chamber, and igniting the injected fuel in the pre-chamber for pre-heating of the pre-chamber prior to injecting fuel in the main combustion chamber for combusting the injected fuel in the main combustion chamber.

13 Claims, 2 Drawing Sheets

(51) Int. Cl.
*F02P 5/04* (2006.01)
*F02D 41/30* (2006.01)
*F02M 57/06* (2006.01)
*F02B 19/12* (2006.01)
*F02N 19/06* (2010.01)
*F02P 5/15* (2006.01)
*F02P 13/00* (2006.01)
*F02D 37/02* (2006.01)
*F02N 19/08* (2010.01)

(56) References Cited

U.S. PATENT DOCUMENTS

| | | | |
|---|---|---|---|
| 8,991,347 B2* | 3/2015 | Miyamoto | F01L 1/3442 123/90.12 |
| 9,353,674 B2* | 5/2016 | Bunce | F02B 19/1057 |
| 9,567,896 B2* | 2/2017 | Pouring | F02B 19/12 |
| 9,822,692 B2* | 11/2017 | Konczol | F02B 19/12 |
| 9,890,689 B2* | 2/2018 | Hampson | F02M 21/0275 |
| 2009/0283058 A1* | 11/2009 | Modroukas | F02B 51/02 123/2 |
| 2012/0103302 A1 | 5/2012 | Attard | |
| 2014/0202407 A1* | 7/2014 | Miyamoto | F01L 1/3442 123/90.15 |
| 2014/0209057 A1* | 7/2014 | Pouring | F02B 19/12 123/257 |
| 2015/0068489 A1* | 3/2015 | Bunce | F02B 19/1057 123/262 |
| 2016/0195003 A1* | 7/2016 | Konczol | F02B 19/12 123/253 |
| 2016/0195051 A1* | 7/2016 | Konczol | F02B 19/1014 123/297 |
| 2016/0230645 A1* | 8/2016 | Schock | F02B 19/12 |
| 2017/0122184 A1* | 5/2017 | Hampson | F02D 41/0027 |

* cited by examiner

METHOD FOR STARTING AN INTERNAL COMBUSTION ENGINE

CROSS-REFERENCE TO RELATED APPLICATIONS

This patent application claims priority to European patent application number 16001518.6 filed Jul. 6, 2016 titled "Method for Starting an Internal Combustion Engine". The subject matter of patent application number 16001518.6 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

SUMMARY

A method for starting an internal combustion engine is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method for starting an internal combustion engine comprises the steps of: providing an internal combustion engine having at least one cylinder and a piston supported at a crankshaft for repeated reciprocal movement in the cylinder so as to define a main combustion chamber, the internal combustion engine further having an ignition device arranged in said cylinder with an igniter portion and a fuel injector which are both arranged at a pre-chamber, wherein the pre-chamber has a plurality of orifices for providing fluid communication between said pre-chamber and the main combustion chamber, injecting fuel in the pre-chamber, and igniting the injected fuel in the pre-chamber for pre-heating of the pre-chamber prior to injecting fuel in the main combustion chamber for combusting the injected fuel in the main combustion chamber.

DETAILED DESCRIPTION

Figure 1:
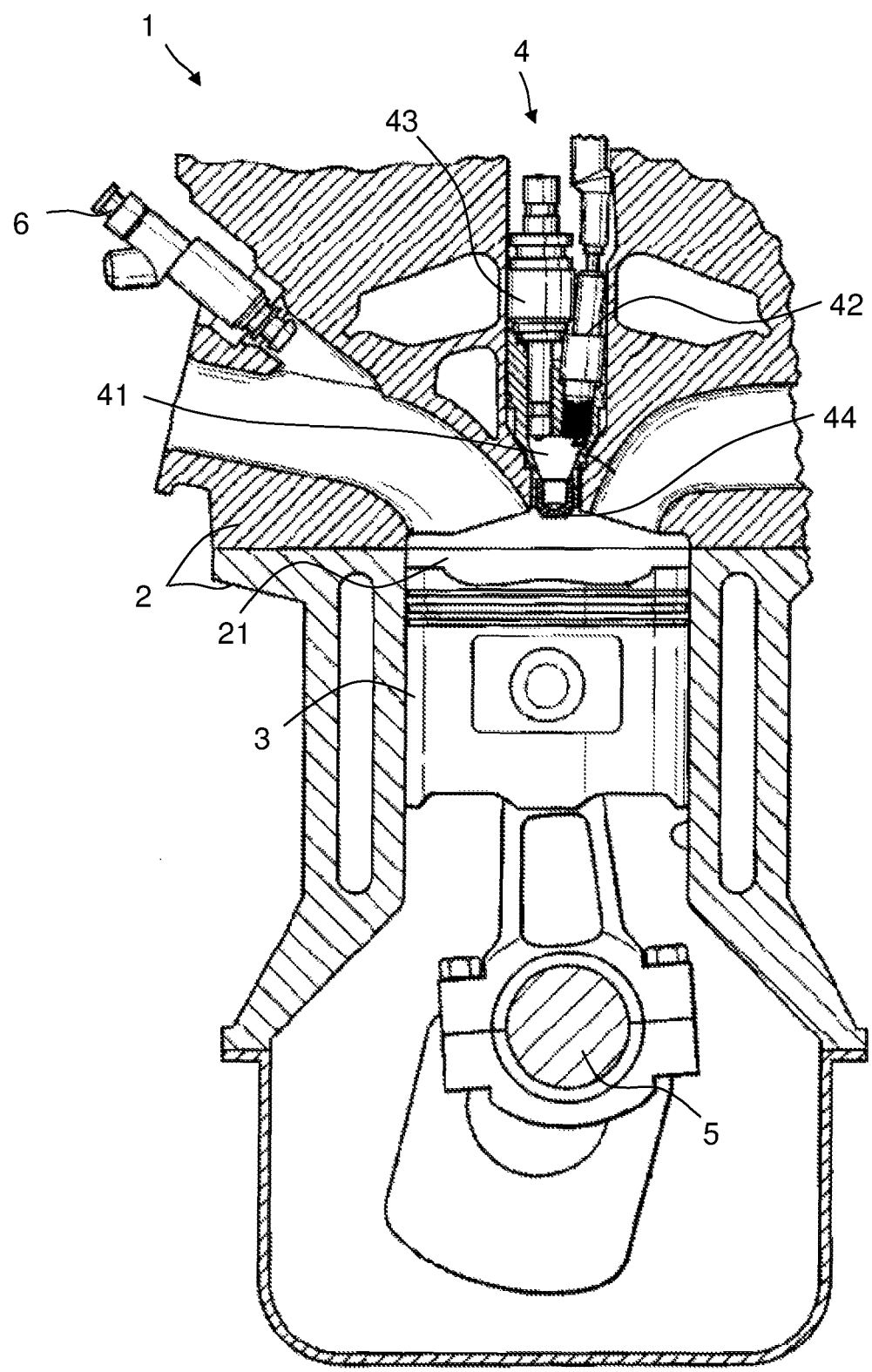
FIG. 1 is a vertical cross-section of an internal combustion engine having an ignition device for turbulent jet ignition.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The present invention relates to a method for starting an internal combustion engine according to the independent claim.

The invention is from the technical field of internal combustion engines having a pre-chamber for the ignition of the combustion chamber by use of turbulent jet ignition and relates in particular to cold start strategies therefore.

A prior art internal combustion engine employing an ignition system for turbulent jet ignition is disclosed in U.S. Pat. No. 2,012,103 302 A1. The internal combustion engine has an engine block with cylinders. Each cylinder has a cylinder head bordering a main combustion chamber in which the main air fuel charge is ignited. A piston is arranged bordering the combustion chamber which is connected via a rod at a crankshaft so as to allow a reciprocal movement. Each cylinder head defines an intake opening and an exhaust opening. The intake and exhaust openings are opened and closed via cam driven valves to provide fluid communication between the cylinder and an intake manifold and an exhaust manifold. The internal combustion engine also includes a fuel injector mounted in the intake manifold as a means of introducing the main fuel/air charge into the combustion chamber through the intake port. The ignition device has an igniter portion and an injector arranged to face an inner pre-chamber volume.

The pre-chamber is shaped so as to form a nozzle having a plurality of orifices disposed spaced from one another and providing fluid communication between the pre-chamber and the combustion chamber. The igniter portion ignites the fuel in the pre-chamber. The orifice diameter is kept small to promote flame quenching as the combustion products exit out of the pre-chamber into the main combustion chamber. Flame quenching means that the partially combusted pre-chamber products are forced through the small orifices of the pre-chamber. The combustion products are extinguished but dispersed through the main combustion chamber then react with the main fuel charge and initiates combustion in the main fuel chamber at multiple locations through chemical, thermal and turbulent effects some distance away from the pre-chamber nozzle.

An improved ignition device capable of creating a more efficient reactive jet is disclosed in U.S. Pat. No. 2,015,006 848 9 A1. The pre-chamber of this ignition device includes a plurality of orifices of an advantageous design (i.e. diameter size) to provide a fluid communication between the pre-chamber volume and the main chamber volume.

The mentioned techniques handling of low ignition qualities of mixtures of ultra-lean air-fuel ratios in internal combustion engines because of turbulent jet ignition (TJI) is a high energy ignition source.

Lambda ($\lambda$) is a fuel-agnostic mass ratio of air to fuel present in a combustion chamber (air-fuel ratio/stoichiometric air-fuel ratio). When exactly enough air is provided to completely burn all of the fuel the ratio is stoichiometric and $\lambda$ is equal 1, and ratios lower than stoichiometric are considered "rich" ($\lambda<1$) while ratios higher than stoichiometric are called "lean" ($\lambda>1$). The present invention distinguishes between the $\lambda$ in the pre-chamber and in the main combustion chamber.

Conventionally the range of $\lambda>1.6$ is an ultra-lean air-fuel ratio. Ultra-lean combustion with $\lambda>1.6$ has demonstrated the ability to both increase net thermal efficiency and significantly reduce NOx emissions. The major limitation in ultra-lean combustion systems is the poor ignition quality of the mixture which results in a "lean limit" for values of $\lambda$ above which the combustion engine does not ignite.

Turbulent jet ignition enables the engine to operate in a homogeneous ultra-lean combustion mode. This combustion mode typically refers to $\lambda$ values greater than 1.6. The technology described herein has been shown to enable ignition of mixtures with lambda values greater than 2.3. Traditional spark ignited engines are generally incapable of operating ultra-lean due to the limited ignition energy present in a traditional spark plug. The jet igniter enables the engine to achieve ultra-lean operation by amplifying the ignition energy of a traditional spark plug. Electrical energy from the spark plug is used to convert the small quantity of fuel and air in the pre-chamber into chemical energy via pre-chamber combustion. The resulting rise in pressure in the pre-chamber causes this chemical energy to rapidly transfer to the main combustion chamber in the form of jets formed as contents pass through the pre-chamber nozzle orifices. Spark plug ignition energy is therefore amplified and distributed in the main combustion chamber, enabling combustion of fuel-air mixtures that nominally have poor ignition quality. The claims contained herein relate to the action of starting a jet ignition engine, in particular prior to transitioning the engine to ultra-lean operation.

A cold start strategy aims to provide methods for starting an internal combustion engine when it is cold compared to its normal operating temperature, e.g. when the engine or vehicle is started after an extended period of time during which there is no engine or vehicle operation and engine temperatures are at or near ambient environment temperatures. There are many ways to define a cold start, e.g. by a predetermined period of time after turning off the engine or by a difference in temperature compared to the normal operating temperature.

Hence it is an object of the invention to provide method for starting an internal combustion engine which is ignited by turbulent jet ignition so that it can quickly transition to operate at lean and ultra-lean air-fuel mixtures and rapidly input heat into the exhaust catalysts to activate said catalysts. The methods described herein pertain to all definitions of engine "cold start".

This object is achieved by a method for starting an internal combustion engine comprising the steps of: Firstly, provide an internal combustion engine having at least one cylinder and a piston supported at a crankshaft for repeated reciprocal movement in the cylinder so as to define a combustion chamber. The internal combustion engine has an ignition device arranged in said cylinder with an igniter portion and a fuel injector which are both arranged at a pre-chamber. The pre-chamber has a plurality of orifices for providing fluid communication between said pre-chamber and the combustion chamber. Secondly, inject fuel in the pre-chamber. Thirdly, ignite the injected fuel in the pre-chamber for pre-heating of the pre-chamber volume and surfaces prior to injecting fuel in the main combustion chamber for combusting the injected fuel in the main combustion chamber.

This method allows for igniting the air-fuel ratio with a low flammability during cold starts in particular when the density of air is high because of the cool temperatures. By pre-heating of the pre-chamber, the starting of the internal combustion engine which is ignited by turbulent jet ignition is improved so that the air-fuel mixtures can be ignited in conditions when the engine is cold compared to the normal operating temperature. The pre-heating of the pre-chamber allows quick production of stable, repeatable combustion within a low number of engine revolutions and, hence, is capable of reducing tailpipe emissions through a rapid increase in exhaust gas temperature which is required for thermal activation of exhaust catalysts to catalyze and/or to capture exhaust products for reducing exhaust emissions.

Specifically, the step of injecting fuel comprises injecting fuel in the pre-chamber only. That means that the fuel injection can be carried out by the fuel injector in the pre-chamber, while the fuel injector for fueling the main combustion chamber does not operate. This allows for separately controlling the mixture in the pre-chamber.

According to an advantageous aspect, the step of injecting fuel in the pre-chamber (only) comprises multiple injections of fuel via fuel injector in the pre-chamber. This allows for adding more fuel and, hence, to provide a rich mixture to be ignited in the pre-chamber which improves flammability of the fuel-air mixture.

It is particularly preferred, when the ignition of injected fuel is carried out in between of each of two subsequent injections of the multiple injections of fuel in the pre-chamber. This kind of operation allows for multiple ignition events at rich pre-chamber mixture conditions.

Preferably, the step of igniting the injected fuel is carried out in between of an identical number of subsequent injections of the multiple injections of fuel in the pre-chamber. This aspect allows for timing the ignition in a manner to ignite at evenly rich mixtures in the pre-chamber (e.g. when the mixture in the pre-chamber at two injections is lean compared to at three injections).

According to another aspect, the injection of fuel in the pre-chamber and the ignition of the injected fuel are carried out after a predetermined time duration T starting from the injection of fuel. This allows for igniting the injected fuel independent from a angular position of the rotating engine components (e.g. crank shaft), i.e. on a time-based schedule, whereby the relative timing of injection of fuel in the pre-chamber and the spark event are specified based on time duration T.

An alternative aspect relates to that the injection of fuel in the pre-chamber and the ignition of the injected fuel are carried out after a predetermined angular movement of rotating engine components (e.g. crank shaft). This allows for igniting the injected fuel in the pre-chamber without the need for a time based control unit and the operation can be controlled on a rotating angular position-based schedule, i.e. relative timing of injection of fuel in the pre-chamber and the spark event are specified based on angular position of rotating engine components.

According to another preferred aspect, the injection of fuel in the pre-chamber and the ignition of the injected fuel are carried out prior to a compression move of the piston in the cylinder. This aspect allows for a fast cold start operation, in which the pre-chamber volume and surfaces are pre-heated prior to the first compression and subsequent ignition in the main combustion chamber.

Advantageously, the injection of fuel in the pre-chamber and the ignition of the injected fuel are carried out at different individual angular positions of the rotating engine components (e.g. crankshaft) for a predetermined time interval t. This allows for controlling the pre-chamber mixture based on the chosen time interval t.

According to an alternative aspect, the injection of fuel in the pre-chamber and the ignition of the injected fuel are carried out at a continuous range of angular positions a of the rotating engine parts (e.g. crankshaft). This allows for controlling the pre chamber mixture based on the chosen continuous range of angular positions a of the crankshaft, i.e. the wider the range a, the richer the pre-chamber mixture is.

It is particularly preferred that the injection of fuel in the pre-chamber and the ignition of the injected fuel are carried out prior to a movement of the rotating engine components (e.g. crankshaft). This allows carrying out the pre-heating over a comparably long period of time prior to the combustion in the main combustion chamber, what can be particularly advantageous in case of low ambient temperatures.

According to another preferred aspect, the amount of injected fuel in the pre-chamber is chosen so that the lambda value $\lambda$ is equal to 1 in the pre-chamber. Global lambda in the pre-chamber subsequent to the fuel injection event in the pre-chamber can be approximated according to the following equation:

$$\frac{\text{Main chamber } AFR \times \text{Mass in cylinder}(g) \times \frac{\text{Prechamber } vol \text{ (L)}}{\text{Main chamber } vol \text{ (L)}}}{\frac{1}{\text{Main chamber } AFR} \times \text{Mass in cylinder (g)} \times \frac{\text{Prechamber } vol \text{ (L)}}{\text{Main chamber } vol \text{ (L)}} + \frac{\text{Fuel injected in prechamber (g)}}{(\text{Stoichiometric } AFR)}}$$

AFR=air-fuel ratio
vol=pre-chamber volume

Another preferred aspect relates to that the amount of injected fuel in the pre-chamber is chosen so that $\lambda$ is less than 1. A rich mixture is regarded to provide enhanced flammability of the mixture in the pre-chamber.

The invention relates according to an alternative to that the fuel is injected in the pre-chamber only to that the method further comprises the step of injecting fuel in the pre-chamber and simultaneously injecting fuel in the main combustion chamber. This allows improved simultaneous controlling of the mixture in the main combustion chamber. This can be carried out by a direct injector provided in a manner facing the main combustion chamber or the inlet channel which can be opened towards the main combustion chamber via an inlet valve.

It is particularly preferred, if the amount of injected fuel in the main combustion chamber is chosen so that $\lambda$ is less than 1.6 in the main combustion chamber. This lean mixture is comparably rich to the nominal ultra-lean mixtures. The mixture can be changed to ultra lean after the cold start strategy disclosed herein has been carried out and stable combustion is achieved.

A particularly preferred aspect relates to that the amount of injected fuel in main combustion chamber is chosen so that $\lambda$ is less than 1 in the main combustion chamber. This mixture is rich compared to an overall standard combustion engine operation and can advantageous if the engine is operated in a cold environment.

In FIG. 1, an example for internal combustion engine 1 is given which shows in the present illustration one cylinder 2 and a piston 3 supported at a crankshaft 5 for repeated reciprocal movement in the cylinder 2. Cylinder 2 an piston 3 define a main combustion chamber 21. Internal combustion engine 1 has an ignition device 4 arranged to face the combustion chamber 21. Ignition device 4 has an igniter portion 42 and a fuel injector 43 which are both arranged at a pre-chamber 41 so as to form a part of the inner volume of the pre-chamber 41. The pre-chamber 41 has a plurality of orifices 44 for providing fluid communication between the inner volume of pre-chamber 41 and the inner volume of main combustion chamber 21.

According to the invention, the fuel is injected in pre-chamber 41, which can be achieved by use of fuel injector 43. Subsequently, the injected fuel is ignited in the pre-chamber 41 via the igniter portion 42. The generated combustion heat allows for pre-heating of the pre-chamber 41. The pre-heating is carried out prior to injecting fuel via direct injector 6 in the main combustion chamber 21 for combusting the injected fuel in the main combustion chamber 21.

During cold starts in particular when fuel-air mixtures and combustion chamber surfaces are cold, causing a high degree of heat transfer thereby inhibiting complete combustion kinetics, by pre-heating of the pre-chamber 41, the starting of the internal combustion engine 1 which is ignited by turbulent jet ignition is improved, in particular at or prior to operation with ultra-lean air-fuel mixtures. The pre-heating of the pre-chamber 41 allows quickly producing a stable, repeatable combustion within a low number of crank shaft 5 revolutions and, hence, is capable of reducing tailpipe emissions through a rapid increase in exhaust gas temperature which is required for thermal activation of exhaust catalysts to capture/catalyze exhaust products for reducing the emission.

Figure 2:
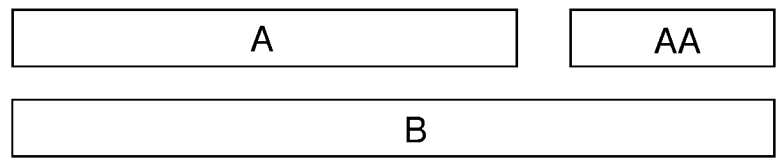
FIG. 2 is a block diagram describing the steps of a method for operating an internal combustion engine.

The method for operating an internal combustion engine (as shown in FIG. 1) is illustrated by the block diagram of FIG. 2. The reference numbers of FIG. 1 and FIG. 2 correspond to each other so that in the following the reference numbers shown in FIG. 1 are used for the description of FIG. 2.

Step A relates to the injection of fuel in the pre-chamber 41. Preferably, the step of injecting fuel is carried out by injecting fuel in the pre-chamber 41 only. In the present example, the step of injecting fuel in the pre-chamber 41 can comprise multiple injections (Step A, Step A, Step A, . . . ) of fuel via fuel injector 43 in the pre-chamber 41.

In the step B the injected fuel in the pre-chamber 41 is ignited via the igniter portion 43 for pre-heating of the pre-chamber 41 (volume) prior to injecting fuel via direct injector 6 in the main combustion chamber 21 for combusting the injected fuel in the main combustion chamber 21.

In case of multiple fuel injections (Step A, Step A, Step A, . . . ), for timing the ignition (Step B) in a manner to ignite at evenly rich mixtures in the pre-chamber 41, the step of igniting the injected fuel (Step B) is carried out in between of an identical number of subsequent injections of the multiple injections (Step A, Step A, Step B, Step A, Step A, Step B, . . . ) of fuel in the pre-chamber 41.

To allow for the operation on a time-based schedule, whereby the relative timing of injection of fuel in the pre-chamber 41 and the spark event are specified based on time duration t, the injection of fuel in the pre-chamber 41 (Step A) and the ignition of the injected fuel (Step B) are carried out after a predetermined time duration t starting from the injection of fuel. As an alternative thereto, the injection of fuel in the pre-chamber 41 and the ignition of the injected fuel are carried out after a predetermined angular movement of rotating engine components (e.g. crank shaft 5).

Step AA relates to that according to an alternative, the step of injecting fuel in the pre-chamber 41 and injecting fuel in the main combustion chamber 21 via direct injector 6 are carried out simultaneously. This allows improved control of the mixture in the main combustion chamber 21 and the pre-chamber.

During the cold start operation, the mixture in the pre-chamber 41 is preferably rich with $\lambda$ less than 1. After the cold start has been carried out, the mixture in the main combustion chamber 21 is chosen to be ultra lean with $\lambda$ more than 1.6 and in particular in the range of $\lambda$ in between of 1.6 to 2.3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for starting an internal combustion engine comprising the steps of:
    providing an internal combustion engine having at least one cylinder and a piston supported at a crankshaft for repeated reciprocal movement in the cylinder so as to define a main combustion chamber, the internal combustion engine further having an ignition device arranged in said cylinder with an igniter portion and a fuel injector which are both arranged at a pre-chamber, wherein the pre-chamber has a plurality of orifices for providing fluid communication between said pre-chamber and the main combustion chamber;
    injecting fuel in the pre-chamber at the start of an engine cycle so that the lambda value $\lambda$ in the pre-chamber is less than 1;
    subsequently igniting the injected fuel in the pre-chamber, thereby pre-heating the pre-chamber prior to a compression of the piston in the cylinder in said engine cycle, and causing combustion jets to exit the pre-chamber via the plurality of orifices and enter the main combustion chamber; and
    subsequent to pre-heating of the pre-chamber, injecting fuel in the main combustion chamber in said engine cycle so that the lambda value $\lambda$ in the main combustion chamber is less than 1.6, wherein the combustion jets cause combustion of the injected fuel in the main combustion chamber.

2. The method according to claim 1, wherein the step of injecting fuel in the pre-chamber comprises injecting fuel in the pre-chamber only.

3. The method according to claim 2, wherein the step of injecting fuel in the pre-chamber comprises multiple injections of fuel via fuel injector in the pre-chamber.

4. The method according to claim 3, wherein the step of igniting the injected fuel in the pre-chamber is carried out in between subsequent multiple injections of fuel in the pre-chamber.

5. The method according to claim 1, wherein the injection of fuel in the pre-chamber and the ignition of the injected fuel in the pre-chamber are carried out after a predetermined time duration T starting from the injection of fuel in the pre-chamber.

6. The method according to claim 1, wherein the injection of fuel in the pre-chamber and the ignition of the injected fuel in the pre-chamber are carried out after a predetermined angular movement of rotating engine components.

7. The method according to claim 1, wherein the injection of fuel in the pre-chamber and the ignition of the injected fuel in the pre-chamber are carried out prior to a first compression move of the piston in the cylinder.

8. The method according to claim 1, wherein the injection of fuel in the pre-chamber and the ignition of the injected fuel in the pre-chamber are carried out at different individual angular positions of the rotating engine components for a predetermined time interval t.

9. The method according to claim 1, wherein the injection of fuel in the pre-chamber and the ignition of the injected fuel in the pre-chamber is carried out at a continuous range of angular positions a of the crankshaft.

10. The method according to claim 1, wherein the injection of fuel in the pre-chamber and the ignition of the injected fuel in the pre-chamber are carried out prior to a movement of the crankshaft.

11. The method according to claim 1, wherein the amount of injected fuel in the pre-chamber is chosen so that the air/fuel ratio $\lambda$ is less than 1.

12. The method according to claim 1, further comprising the step of injecting fuel in the pre-chamber comprises the step of simultaneously injecting fuel in the main combustion chamber.

13. The method according to claim 12, wherein the amount of injected fuel in the main combustion chamber is chosen so that the air/fuel ratio $\lambda$ is less than 1 in the main combustion chamber.

\* \* \* \* \*